(12) United States Patent
Zhang et al.

(10) Patent No.: US 11,012,771 B2
(45) Date of Patent: May 18, 2021

(54) EARPHONE

(71) Applicant: HUAWEI TECHNOLOGIES CO., LTD., Guangdong (CN)

(72) Inventors: Yunjie Zhang, Dongguan (CN); Dawei Ding, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 469 days.

(21) Appl. No.: 16/077,986

(22) PCT Filed: May 4, 2017

(86) PCT No.: PCT/CN2017/083081
§ 371 (c)(1),
(2) Date: Aug. 14, 2018

(87) PCT Pub. No.: WO2017/198075
PCT Pub. Date: Nov. 23, 2017

(65) Prior Publication Data
US 2020/0413181 A1 Dec. 31, 2020

(30) Foreign Application Priority Data
May 20, 2016 (CN) .......................... 201610340137.0

(51) Int. Cl.
*H04R 1/06* (2006.01)
*H04R 1/10* (2006.01)
(Continued)

(52) U.S. Cl.
CPC .......... *H04R 1/1058* (2013.01); *H01R 24/58* (2013.01); *H01R 43/22* (2013.01); *H04B 1/3818* (2015.01);
(Continued)

(58) Field of Classification Search
CPC ............... H04R 1/1033; H04R 25/556; H04R 2420/09; H01R 24/58; G06K 13/08; G06K 13/0806
See application file for complete search history.

(56) References Cited

U.S. PATENT DOCUMENTS 7,837,092 B2 * 11/2010 Wen ....................... G06K 13/08
235/375
8,902,609 B2 * 12/2014 Duan .................. G06K 13/0831
361/807

(Continued)

FOREIGN PATENT DOCUMENTS

CN 102960936 A 3/2013
CN 203984479 U 12/2014
(Continued)

OTHER PUBLICATIONS

International Search Report and Written Opinion issued in International Application No. PCT/CN2017/083081 dated Jun. 28, 2017, 17 pages.

(Continued)

*Primary Examiner* — Ryan Robinson
(74) *Attorney, Agent, or Firm* — Fish & Richardson P.C.

(57) ABSTRACT

The present invention provides an earphone, including: an earphone base; an earphone plug, where the earphone plug is disposed on the earphone base; an eject pin configured to remove a card tray of a mobile terminal, where the eject pin is disposed in the earphone plug and the eject pin is connected to the earphone base by using a spring; and a pin controller, where the pin controller is connected to the earphone base, and the pin controller controls the eject pin to extend out of the earphone plug along an axial direction of the earphone plug or to retract into the earphone plug.

9 Claims, 4 Drawing Sheets

(51) Int. Cl.
*H04B 1/3818* (2015.01)
*H01R 24/58* (2011.01)
*H01R 43/22* (2006.01)

(52) U.S. Cl.
CPC .... *H04R 2201/105* (2013.01); *H04R 2420/09* (2013.01)

(56) References Cited

U.S. PATENT DOCUMENTS

| | | | |
|---|---|---|---|
| 9,281,610 B2* | 3/2016 | Ejiri | G06K 13/0831 |
| 9,646,231 B2* | 5/2017 | Wang | G06K 13/08 |
| 2018/0262600 A1 | 9/2018 | Qiu | |

FOREIGN PATENT DOCUMENTS

| | | |
|---|---|---|
| CN | 204669408 U | 9/2015 |
| CN | 104993354 A | 10/2015 |
| CN | 204810494 U | 11/2015 |
| CN | 205029706 U | 2/2016 |
| CN | 205142464 U | 4/2016 |
| CN | 205176098 U | 4/2016 |
| CN | 205790602 U * | 12/2016 |
| CN | 205790602 U | 12/2016 |
| CN | 211351041 U * | 8/2020 |
| DE | 102011116940 A1 | 5/2013 |
| EP | 0830743 B1 | 8/2008 |
| KR | 200181930 Y1 | 5/2000 |

OTHER PUBLICATIONS

Chinese Office Action issued in Chinese Application No. 201610340137.0 dated Dec. 5, 2018, 4 pages.
Chinese Search Report issued in Chinese Application No. 2016103401370 dated Nov. 26, 2018, 3 pages.
Extended European Search Report issued in European Application No. 17798638.7 dated Mar. 19, 2019, 5 pages.

* cited by examiner

Eject pin 700

710   720

EARPHONE

CROSS-REFERENCE TO RELATED APPLICATIONS

This application is a national stage of International Application No. PCT/CN2017/083081, filed on May 4, 2017, which claims priority to Chinese Patent Application No. 201610340137.0, filed on May 20, 2016. Both of the aforementioned applications are hereby incorporated by reference in their entireties.

TECHNICAL FIELD

Embodiments of the present invention relate to the mobile terminal field, and more specifically, to an earphone.

BACKGROUND

At present, due to an increasingly compact internal structure of a mobile terminal, there are few models that can implement a dual-card dual-standby function and TF card expansion, bringing much inconvenience to consumers. To meet needs of the consumers, a supplier configures a subscriber identity module (Subscriber Identity Module, SIM) card in one card slot, and configures a Nano-SIM (Nano-SIM) card or a Micro SD card in the other card slot, so that a consumer may replace the card in the other card slot. In this way, a mobile terminal may be used as a dual-card dual-standby mobile terminal, or may be a mobile terminal with an expandable TF memory. To embed the foregoing SIM card and TF card in the mobile terminal in a more compact manner, an integrated card slot may be used as the card slot. However, removing an integrated card slot requires an eject pin.

FIG. 1 is a schematic structural diagram of a card slot area of a mobile terminal. A card slot shown in FIG. 1 can be removed by using an eject pin, that is, to insert the eject pin into an eject pin hole next to the card slot, to eject the card slot. FIG. 2 is a schematic structural diagram of an eject pin in the prior art. It can be learned that the eject pin shown in FIG. 2 is not convenient to carry and is easily lost, affecting removal of the card slot by a user and deteriorating user experience.

SUMMARY

An objective of this application is to provide an earphone, so that an eject pin is convenient to carry and not easily lost, thereby improving user experience.

According to a first aspect, this application provides an earphone, where the earphone includes an earphone base; an earphone plug, where the earphone plug is disposed on the earphone base; an eject pin for removing a card tray of a mobile terminal, where the eject pin is disposed in the earphone plug and the eject pin is connected to the earphone base by using a spring; and a limiting mechanism, where the limiting mechanism is connected to the earphone base, and controls the eject pin to extend out of the earphone plug along an axial direction of the earphone plug or to retract into the earphone plug.

According to this solution, the eject pin is integrated in the earphone, so that the eject pin is convenient to carry and not easily lost, thereby improving user experience of a terminal device.

With reference to the first aspect, in a possible implementation of the first aspect, a reset pin is disposed on the eject pin, and the limiting mechanism includes: a knob, where the knob is disposed between the earphone base and the earphone plug, an odd-shaped cam is disposed on an inner surface of the knob, a spring tightly presses the reset pin against a profile line of the odd-shaped cam, and when the odd-shaped cam rotates, the reset pin is pushed to drive the eject pin to move back and forth along the axial direction of the earphone plug.

According to this solution, the odd-shaped cam rotates along with the knob, so as to make the reset pin (a driven element) drive the eject pin to move back and forth along an axial line of the earphone plug. In this way, the earphone can switch between a normal state of being used as an earphone and a state of being used as an eject pin.

With reference to the first aspect and the foregoing possible implementation, in a possible implementation of the first aspect, a pin slot is disposed in the eject pin, a pin hole is disposed in the earphone base, the limiting mechanism includes a limiting pin, and the earphone further includes: a reset block, where the reset block is connected to the earphone base by fitting a pin with the pin hole; and an elastic element, where the elastic element is disposed between the earphone base and the reset block to tightly press the limiting pin on the reset block against the eject pin.

In this solution, the limiting pin fits with the pin slot disposed in the eject pin, so that the earphone can switch between a normal state of being used as an earphone and a state of being used as an eject pin.

With reference to the first aspect and any one of the foregoing possible implementations, in a possible implementation of the first aspect, a pin hole is disposed in the reset block, and there is interference fit between the limiting pin and the pin hole on the reset block.

With reference to the first aspect and any one of the foregoing possible implementations, in a possible implementation of the first aspect, the elastic element includes a rubber block.

With reference to the first aspect and any one of the foregoing possible implementations, in a possible implementation of the first aspect, the earphone further includes a set screw, and the spring is connected to the earphone base by using the set screw.

With reference to the first aspect and any one of the foregoing possible implementations, in a possible implementation of the first aspect, an axial line of the eject pin coincides with an axial line of the earphone plug.

With reference to the first aspect and any one of the foregoing possible implementations, in a possible implementation of the first aspect, the eject pin includes a guide body and a steel pin, and the steel pin is embedded in the guide body.

With reference to the first aspect and any one of the foregoing possible implementations, in a possible implementation of the first aspect, the guide body of the eject pin is made of a nylon material.

In some implementations, the foregoing profile line of the odd-shaped cam may refer to an actual shape of the odd-shaped cam.

According to this solution, the eject pin is integrated in the earphone, so that the eject pin is convenient to carry and not easily lost, thereby improving user experience of a terminal device.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

An embodiment of the present invention provides an earphone, including: an earphone base; an earphone plug, where the earphone plug is disposed on the earphone base; an eject pin for removing a card tray of a mobile terminal, where the eject pin is disposed in the earphone plug and the eject pin is connected to the earphone base by using a spring; and a limiting mechanism, where the limiting mechanism is connected to the earphone base, and controls the eject pin to extend out of the earphone plug along an axial direction of the earphone plug or to retract into the earphone plug.

According to this solution, the eject pin is integrated in the earphone, so that the eject pin is convenient to carry and not easily lost, thereby improving user experience of a terminal device.

Optionally, in an embodiment, a reset pin is disposed on the eject pin, and the limiting mechanism includes: a knob, where the knob is disposed between the earphone base and the earphone plug, an odd-shaped cam is disposed on an inner surface of the knob, the spring tightly presses the reset pin against a profile line of the odd-shaped cam, and when the odd-shaped cam rotates, the reset pin is pushed to drive the eject pin to move back and forth along the axial direction of the earphone plug.

Figure 1:
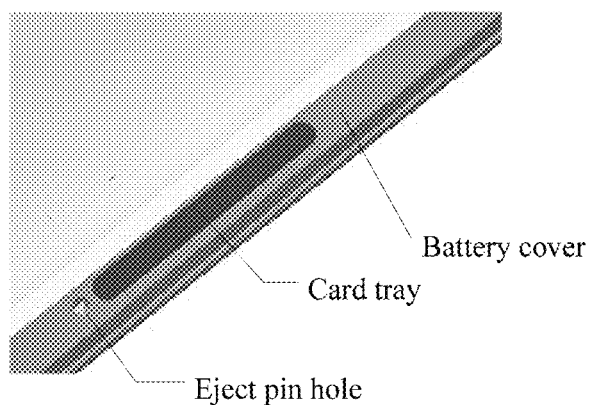
FIG. 1 is a schematic structural diagram of a card slot area of a mobile terminal.
Figure 2:
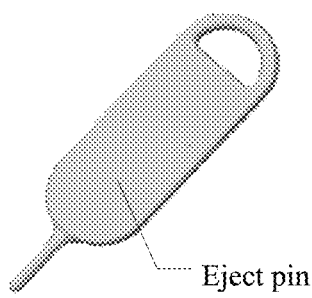
FIG. 2 is a schematic structural diagram of an eject pin in the prior art.
Figure 3:
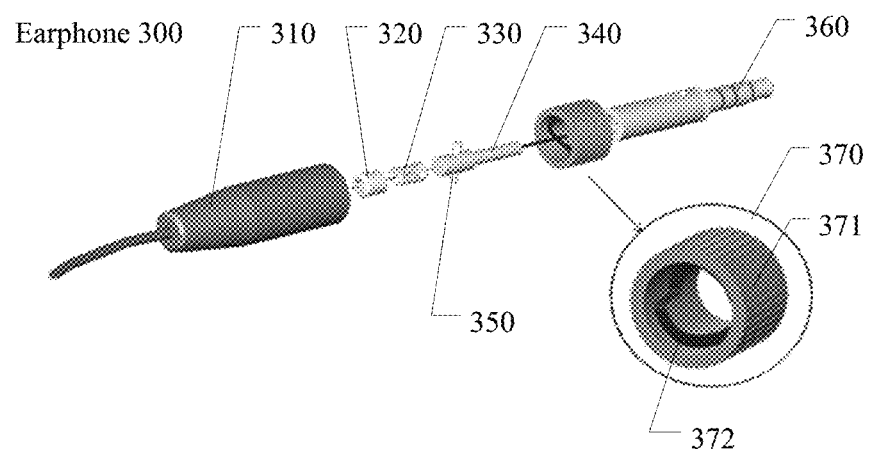
FIG. 3 is a schematic three-dimensional structural exploded view of an earphone according to an embodiment of the present invention.

Specifically, FIG. 3 is a schematic three-dimensional structural exploded view of an earphone according to an embodiment of the present invention. An earphone 300 shown in FIG. 3 includes an earphone base 310, a set screw 320, a spring 330, an eject pin 340, a reset pin 350, an earphone plug 360, a knob 370, and an odd-shaped cam 372.

It can be seen from a detailed diagram 371 of the knob shown in FIG. 3 that the spring 330 tightly presses the reset pin 350 against a profile line of the odd-shaped cam 372. The odd-shaped cam 372 is disposed on an inner surface of the knob 370. When the knob 370 rotates, the odd-shaped cam 372 pushes the reset pin 350, so that the reset pin 350 drives the eject pin 340 to move back and forth along an axial line of the earphone plug 360. When the reset pin 350 is on a return stroke of a displacement curve of the odd-shaped cam 372, the eject pin 340 makes the spring 330 be in a compressed state and retract into the earphone plug 360, that is, the eject pin 340 is in a position corresponding to a non-working state. In this case, the earphone can be used as an earphone. When the reset pin 350 is on an extending stroke of the displacement curve of the odd-shaped cam 372, the eject pin 340 is pushed by the spring 330 and extends out of the earphone plug 360, that is, the eject pin 340 in this case is in a position corresponding to a working state.

It should be understood that in the detailed diagram 371 shown in FIG. 3, the odd-shaped cam 372 may be a boss on an inner surface of the knob 370, or the odd-shaped cam 372 may be a notch on an inner surface of the knob 370. In this case, the reset pin on the eject pin is buckled in the notch. When the knob rotates, the reset pin may be driven to move to make the eject pin move back and forth along an axial direction of the earphone plug.

It should further be understood that a card slot may be disposed at an end at which the knob is connected to the earphone plug, where the earphone plug fastens the knob between the earphone base and the earphone plug by using the card slot.

Optionally, in an embodiment, a pin slot is disposed in the eject pin, a pin hole is disposed in the earphone base, the limiting mechanism includes a limiting pin, and the earphone further includes: a reset block, where the reset block is connected to the earphone base by fitting a pin with the pin hole; and an elastic element, where the elastic element is disposed between the earphone base and the reset block to tightly press the limiting pin on the reset block against the eject pin.

Figure 4:
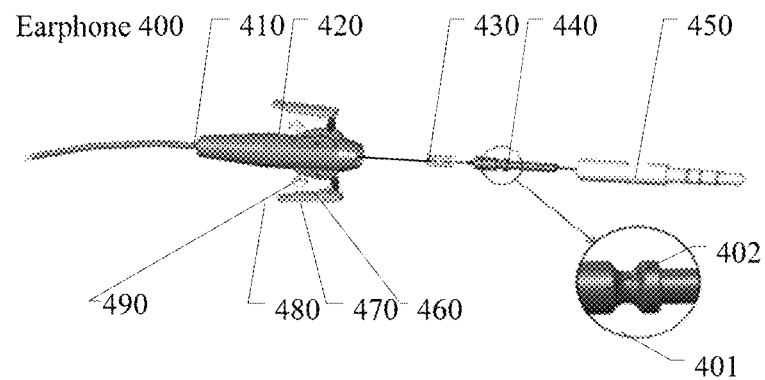
FIG. 4 is a schematic three-dimensional structural exploded view of an earphone according to another embodiment of the present invention.

FIG. 4 is a schematic three-dimensional structural exploded view of an earphone according to another embodiment of the present invention. An earphone 400 shown in FIG. 4 includes an earphone base 410, an elastic rubber block 420, a spring 430, an eject pin 440, an earphone plug 450, a limiting pin 460, a pin 470, and a reset block 480, and a pin hole 490 is disposed in the earphone base 410.

Specifically, the reset block 480 is fastened onto the earphone base 410 by fitting the pin 470 with the pin hole 490. The elastic rubber block 420 tightly presses the limiting pin 460 on the reset block 480 against the eject pin 440 by using an elastic force of the elastic rubber block 420. A user may use an external force to push the eject pin 440 that extends out of the earphone plug 450, back into the earphone plug 450 until the limiting pin 460 on the reset block 480 gets buckled in a pin slot 402 (referring to a partial detailed diagram 401 shown in FIG. 4). In this case, the eject pin 440 is fastened into the earphone plug 450 by fitting the limiting pin 460 with the pin slot 402, and the earphone can be used as an earphone. When a user presses a rear end of the reset block 480 (an end, close to the elastic rubber block 420, of the reset block 480), the elastic rubber block 420 is compressed. The reset block 480 may rotate around the pin 470 fastened in the pin hole 490, that is, a front end (an end connected to the limiting pin 460) of the reset block 480 opens outwards. In this case, the limiting pin 460 separates from the pin slot 402 on the eject pin 440 and the eject pin 440 is ejected out from the earphone plug 450 under an elastic force of the spring 430, and the earphone can be used as an eject pin.

Optionally, in an embodiment, a pin hole is disposed in the reset block, and there is interference fit between the limiting pin and the pin hole on the reset block.

Specifically, in the earphone 400 shown in FIG. 4, the limiting pin 460 fits with the pin hole disposed in the reset block 480.

It should be understood that the limiting pin may also be fastened on the reset block by bonding. A specific manner of connecting the limiting pin to the reset block is not limited in this embodiment of the present invention.

Optionally, in an embodiment, the elastic element includes a rubber block.

It should be understood that the elastic element may be a spring or another elastic element. A specific form of the elastic element is not limited this embodiment of the present invention.

Optionally, in an embodiment, the earphone further includes a set screw, and the spring is connected to the earphone base by using the set screw.

Figure 5:
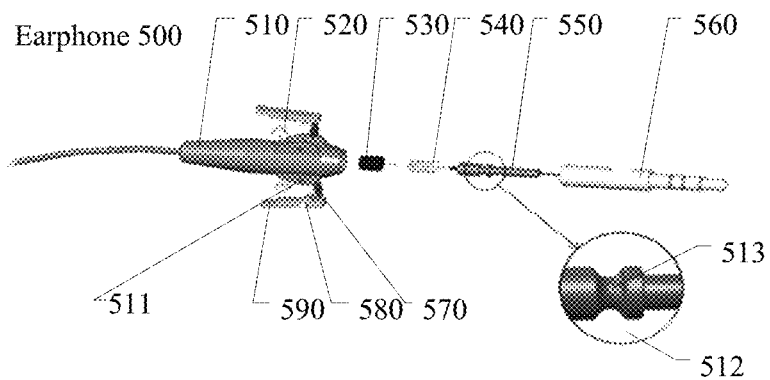
FIG. 5 is a schematic three-dimensional structural exploded view of an earphone according to another embodiment of the present invention.
Figure 6:
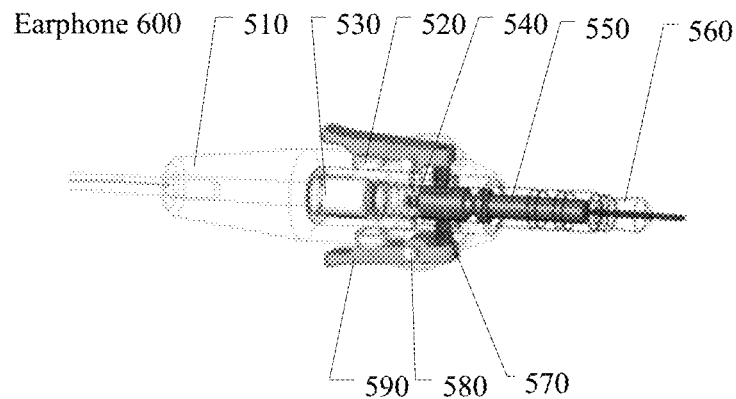
FIG. 6 is a schematic three-dimensional structural assembly view of an earphone according to another embodiment of the present invention.

FIG. 5 is a schematic three-dimensional structural exploded view of an earphone according to another embodiment of the present invention. An earphone 500 shown in FIG. 5 includes: an earphone base 510, an elastic rubber block 520, a set screw 530, a spring 540, an eject pin 550, an earphone plug 560, a limiting pin 570, a pin 580, and a reset block 590, and a pin hole 511 is disposed in the earphone base 510. FIG. 6 is a schematic three-dimensional structural assembly view of an earphone according to another embodiment of the present invention. The following describes a working principle of the earphone in detail with reference to FIG. 5 and FIG. 6. It should be understood that parts, same as those in the earphone 500 shown in FIG. 5, of an earphone 600 shown in FIG. 6 use same reference numerals.

Specifically, the elastic rubber block 520 tightly presses the limiting pin 570 on the reset block 590 against the eject pin by using an elastic force of the elastic rubber block 520. A user may use an external force to push the eject pin 550 that extends out of the earphone plug 560 (a position relationship between the earphone plug 560 and the eject pin 550 shown in FIG. 6), back into the earphone plug 560 until the limiting pin 570 on the reset block 590 gets buckled in a pin slot 513 (referring to a partial detailed diagram 512 shown in FIG. 5) on the eject pin 550. In this case, the eject pin 550 is fastened into the earphone plug 560 by fitting the limiting pin 570 with the pin slot 513, and the earphone can be used as an earphone. When a user presses a rear end of the reset block 590 (an end, close to the elastic rubber block 520, of the reset block 590), of the reset block 590, the elastic rubber block 520 is compressed. The reset block 590 may rotate around the pin 580 fastened in the pin hole 511, that is, a front end (an end connected to the limiting pin 570) of the reset block 590 opens outwards. In this case, the limiting pin 570 separates from the pin slot 513 on the eject pin 550 and the eject pin 550 is ejected out from the earphone plug 560 under an elastic force of the spring 540, and the earphone can be used as an eject pin.

Optionally, in an embodiment, an axial line of the eject pin coincides with an axial line of the earphone plug.

Specifically, with reference to FIG. 6, it can be seen that an axial line of the eject pin 550 coincides with an axial line of the earphone plug 560.

Optionally, in an embodiment, the eject pin includes a guide body and a steel pin, and the steel pin is embedded in the guide body.

Figure 7:
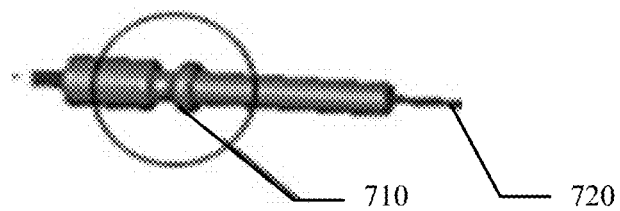
FIG. 7 is a schematic structural diagram of an eject pin of an earphone according to an embodiment of the present invention.

FIG. 7 is a schematic structural diagram of an eject pin of an earphone according to an embodiment of the present invention. An eject pin 700 shown in FIG. 7 includes a guide body 710 and a steel pin 720, where the steel pin 720 is embedded in the guide body 710.

Optionally, in an embodiment, the guide body of the eject pin is made of a nylon material.

According to this solution, the eject pin is integrated in the earphone, so that the eject pin is convenient to carry and not easily lost, thereby improving user experience of a terminal device.

It should be understood that in the embodiments of the present invention, "B corresponding to A" indicates that B is associated with A, and B may be determined according to A. However, it should further be understood that determining A according to B does not mean that B is determined according to A only; that is, B may also be determined according to A and/or other information.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An earphone, comprising:
   an earphone base;
   an earphone plug, wherein the earphone plug is disposed on the earphone base;
   an eject pin configured to remove a card tray of a mobile terminal, wherein the eject pin is disposed in the earphone plug and the eject pin is connected to the earphone base by a spring; and
   a pin controller, wherein the pin controller is connected to the earphone base, and the pin controller controls the eject pin to extend out of the earphone plug along an axial direction of the earphone plug or to retract into the earphone plug.

2. The earphone according to claim 1, wherein a reset pin is disposed on the eject pin, and the pin controller comprises:
   a knob, wherein the knob is disposed between the earphone base and the earphone plug, an odd-shaped cam is disposed on an inner surface of the knob, the spring presses the reset pin against a profile line of the odd-shaped cam, and when the odd-shaped cam rotates, the reset pin is pushed to drive the eject pin to move back and forth along the axial direction of the earphone plug.

3. The earphone according to claim 2, wherein a pin slot is disposed in the eject pin, a pin hole is disposed in the earphone base, the pin controller comprises a limiting pin, and the earphone further comprises:
   a reset block, wherein the reset block is connected to the earphone base by fitting a pin with the pin hole; and
   an elastic element, wherein the elastic element is disposed between the earphone base and the reset block to press the limiting pin on the reset block against the eject pin.

4. The earphone according to claim 3, wherein a pin hole is disposed in the reset block, and there is interference fit between the limiting pin and the pin hole on the reset block.

5. The earphone of claim 3, wherein the elastic element comprises a rubber block.

6. The earphone of claim 1, wherein the earphone further comprises a set screw, and the spring is connected to the earphone base by the set screw.

7. The earphone of claim 1, wherein an axial line of the eject pin coincides with an axial line of the earphone plug.

8. The earphone of claim 1, wherein the eject pin comprises a guide body and a steel pin, and the steel pin is embedded in the guide body.

9. The earphone according to claim 8, wherein the guide body of the eject pin is made of a nylon material.

* * * * *